May 7, 1946.  F. R. KLAUS ET AL  2,399,746
TOWING HITCH FOR TRAILERS
Filed April 15, 1943  4 Sheets-Sheet 1
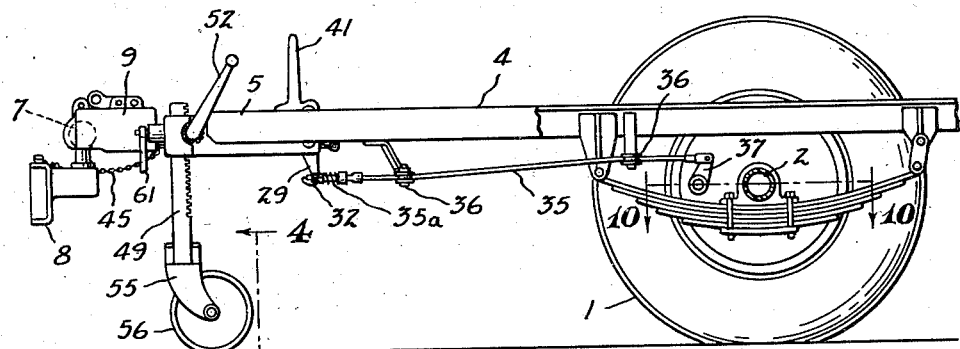
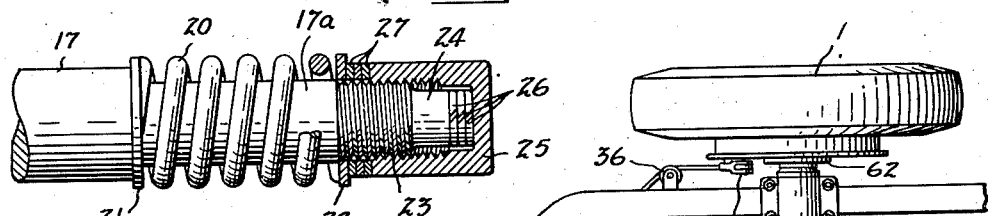
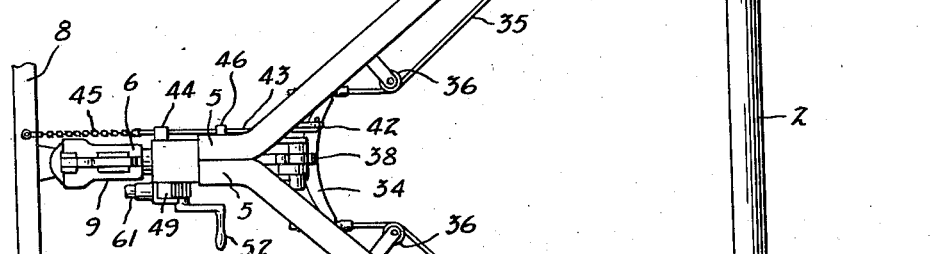
INVENTORS
Fred R. Klaus
Fred M. Klaus
BY Evans + McCoy
ATTORNEYS

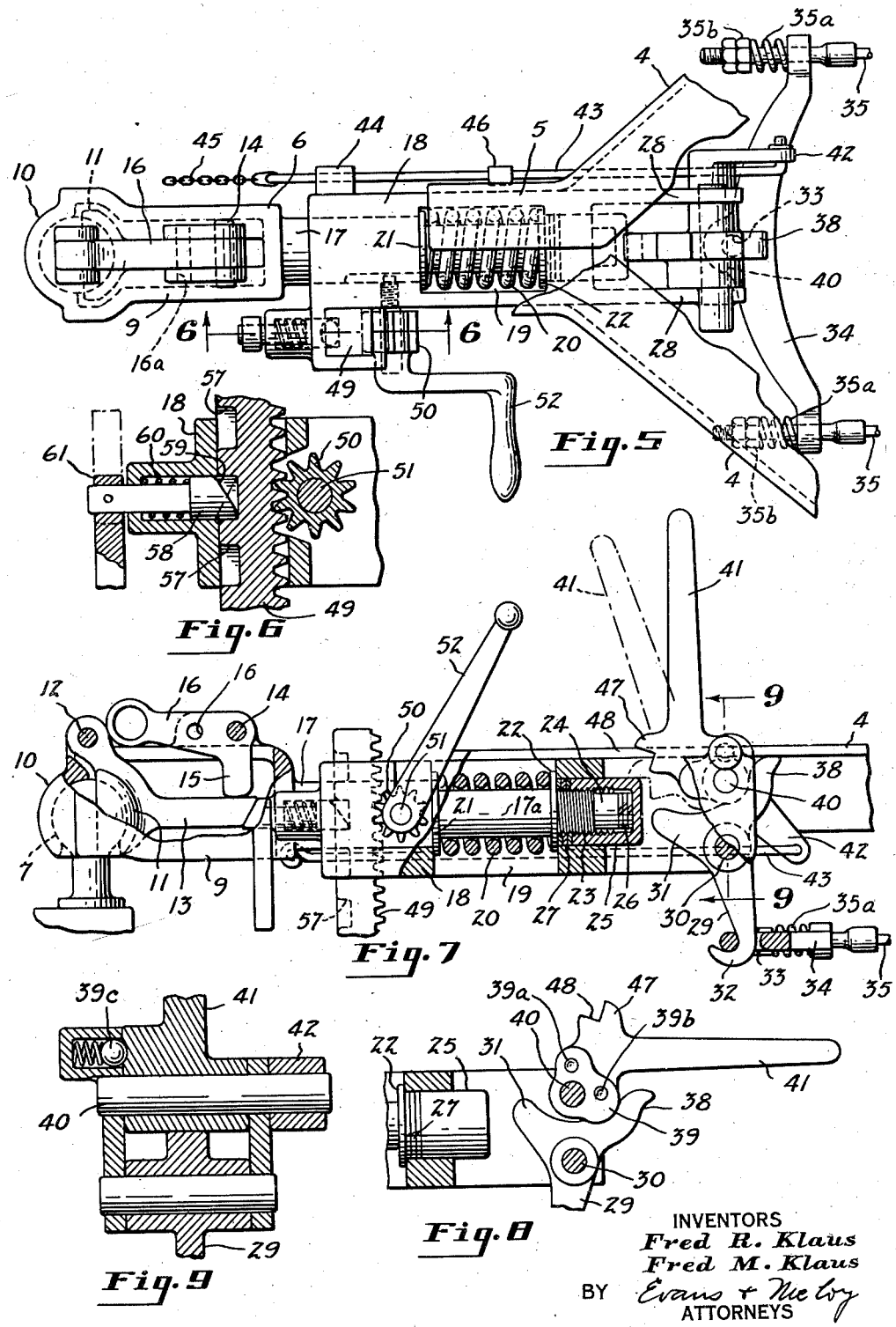

INVENTORS
Fred R. Klaus
Fred M. Klaus
BY Evans & McCoy
ATTORNEYS

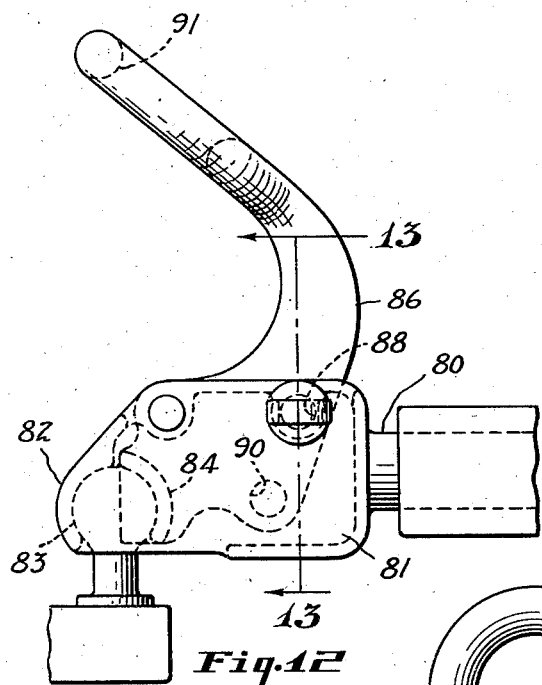
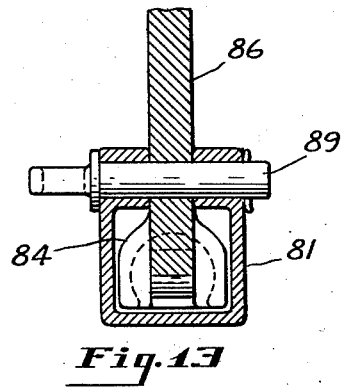
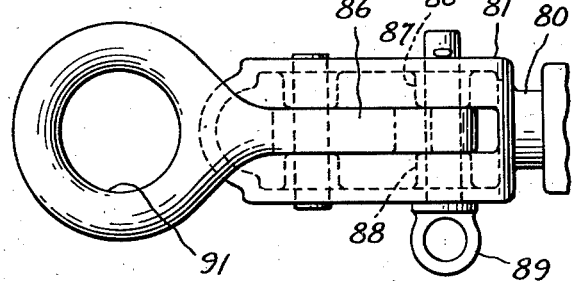
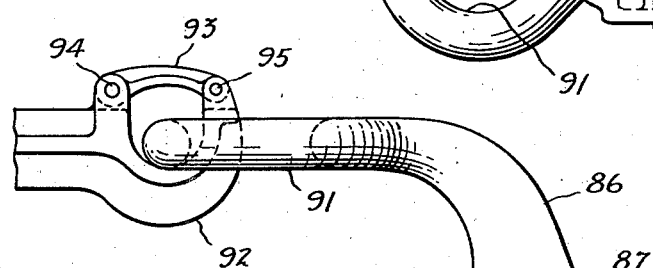
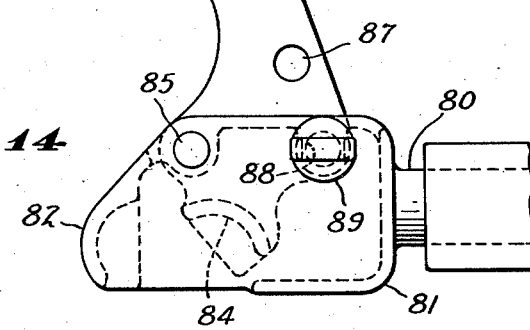

Patented May 7, 1946

2,399,746

UNITED STATES PATENT OFFICE 2,399,746

TOWING HITCH FOR TRAILERS

Fred R. Klaus and Fred M. Klaus, Cleveland Heights, Ohio

Application April 15, 1943, Serial No. 483,086

6 Claims. (Cl. 188—142)

This invention relates to a towing hitch for trailers and particularly to a towing vehicle and trailer combination including trailer towing and controlling devices interposed between the trailer and the towing vehicle.

An important object of the present invention is to provide an effective automatic control of the trailer by means of suitable brakes, an operating mechanism adapted to be actuated by forward pressure exerted by the trailer against the towing vehicle, the mechanism being also provided with means by which it can be operated manually.

A further object of the invention is to provide a brake operating mechanism which is adapted to be actuated automatically to set the trailer brakes when forward pressure is exerted by the trailer on the towing vehicle but which are operative only when the forward pressure of the trailer exceeds a predetermined amount.

A further object of the invention is to provide means for so regulating the pressure actuated controlling device as to vary the amount of pressure which must be applied in order to actuate the brakes.

A further object of the invention is to provide a device which is adapted to be moved manually to either of two positions to set the trailer brakes or to lock out the automatic brake actuating means.

A further object of the invention is to provide a device which is actuated upon an abnormal separation of the trailer from the towing vehicle to automatically set the trailer brakes so that when the coupling beween the trailer and the towing vehicle is broken the trailer will be stopped.

Another object of the invention is to provide an automatic trailer brake operating device that includes a control spring which is so connected to the coupling elements that it serves as a shock absorber to cushion jerks exerted on the trailer as well as forward surges of the trailer.

A further object of the invention is to provide a suitable jack for supporting the forward end of the trailer when it is uncoupled from the towing vehicle, the jack being so designed that it may be easily and quickly moved to an extended or retracted position.

A further object is to provide an improved releasable coupling by which a universal connection is made between the trailer drawbar and the towing vehicle.

A further object is to provide a coupling which is attachable to pivot members located at different heights on towing vehicles.

With the above and other objects in view, the invention may be said to comprise the towing hitch as illustrated in the accompanying drawings hereinafter described and particularly set forth in the appended claims together with such variations and modifications thereof as will be apparent to one skilled in the art to which the invention pertains.

Figure 1 is a side elevation of a trailer and a towing hitch embodying the invention;

Fig. 2 is a top plan view of the trailer chassis and the towing hitch;

Fig. 3 is a fragmentary view showing a portion of the drawbar with the cushioning spring mounted thereon.

Fig. 4 is a rear elevation of the jack caster viewed as indicated at 4—4 in Fig. 1;

Fig. 5 is a top plan view on an enlarged scale showing the forward end of the trailer frame together with the coupling members and the brake actuating elements carried thereby;

Fig. 6 is a section taken on the line indicated at 6—6 in Fig. 5;

Fig. 7 is a side elevation of the frame, coupling members and brake actuating devices shown in Fig. 5, a portion of the frame being broken away to show the drawbar and cushioning spring;

Fig. 8 is a fragmentary side elevation showing the brake actuating hand lever in brake applying position;

Fig. 9 is a section taken on the line indicated at 9—9 in Fig. 7;

Fig. 12 is a side elevation of a modified form of coupling;

Fig. 13 is a section taken on the line 13—13 in Fig. 12;

Fig. 14 is a side elevation of the coupling in another position of adjustment; and Fig. 15 is a top plan view of the coupling in the position shown in Fig. 14.

Figure 10:
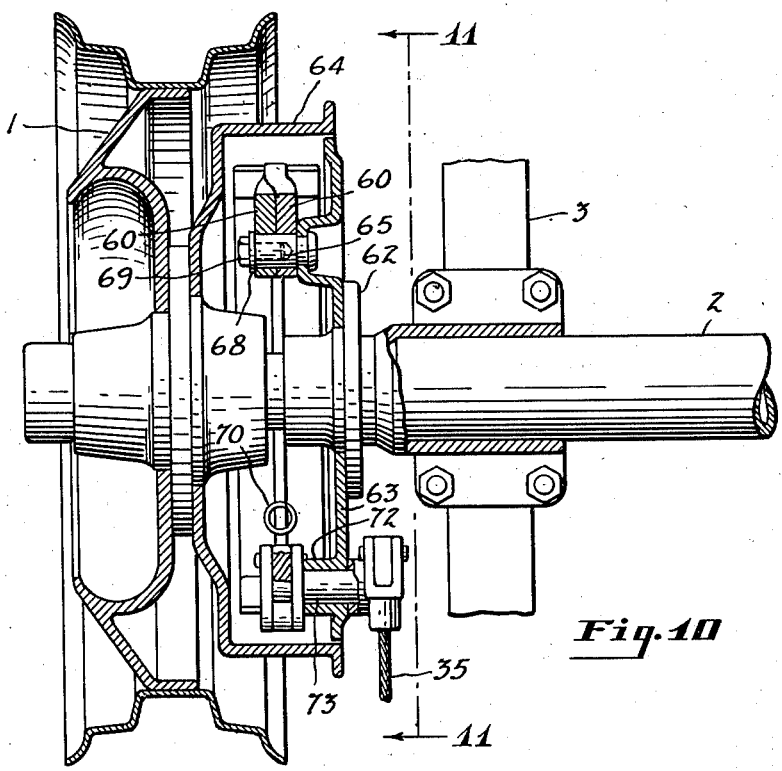
Fig. 10 is a sectional view showing a trailer wheel and the brake carried thereby, the section being taken on the line indicated at 10—10 in Fig. 1.

The accompanying drawings show a fragmentary portion of the rear end of a towing vehicle, a trailer chassis and the towing and controlling connections interposed between the towing vehicle and the trailer. As shown in Figs. 1 and 2, the trailer chassis comprises supporting wheels 1 mounted on an axle 2 which supports side frame members 3 which have converging forward end portions 4 which terminate in end portions 5 which are secured together face to face. Frame members 4 are shown in the form of flanged bars which are secured together with their flanges disposed edge to edge to provide a recessed end portion to receive a coupling member. A drawbar 6 is adapted to be detachably connected to a suitable connecting member such as a ball pivot 7 rigidly secured to the rear end member 8 of the towing vehicle frame. The drawbar 6 has a yoke 9 at its forward end which is provided with a slot of sufficient size to permit the yoke to be slipped over the ball pivot 7. The yoke 9 has a forward integral cross member 10 which has an inner bearing surface of substantially spherical curvature to fit upon the forward side of the ball pivot 7.

Within the slot of the yoke there is pivotally mounted a rear bearing member 11 which has a spherical curved face adapted to engage the rear side of the ball pivot 7 to clamp the drawbar to the pivot and to complete a universal connection between the drawbar and towing vehicle. The bearing member 11 is connected to the yoke 9 by means of a horizontal transverse pivot 12 and has a rearwardly projecting arm 13 which extends horizontally within the slot of the yoke 9 when the bearing member 11 is in pivot engaging position. For locking the member 11 in pivot engaging position a pivot 14 mounted on the yoke 9 and extending across the slot thereof carries a latch 15 adapted to engage the arm 13 of the bearing member to hold the same in pivot engaging position.

The latch 15 has an actuating arm 16 by means of which the latch may be swung from a locking to a releasing position. The latch 15 is so formed that when the arm 16 is in its lowermost position engaging the top of the member 11, the tip of the latch member 15 engages the arm 13 directly beneath the pivot 14 or slightly to the rear of the vertical plane of the pivot axis so that thrusts exerted by the pivot 7 on the bearing member 11 will not tend to disengage the latch. A transverse aperture 16a in the arm 16 may be registered with apertures in the portion of the yoke 9 to which the latch is pivoted to receive a padlock to prevent uncoupling of the towing vehicle from the trailer.

It will be readily seen that the bearing members 10 and 11 and the ball pivot 7 provide a universal joint between the drawbar and the towing vehicle and that by means of the releasable bearing member 11 and locking latch 15, the drawbar may be quickly and easily coupled to or uncoupled from the towing vehicle.

The drawbar 6 has a cylindrical portion 17 which slidably fits in a bearing member 18 which is mounted in the recess between the front end portions 5 of the trailer side frame members and rigidly attached to the end portions 5. The bearing member 18 has a rectangular slot 19 intermediate its ends through which the drawbar extends, and a coil spring 20 is mounted upon a reduced portion 17a of the drawbar which extends through the slot 19. The spring 20 is mounted between front and rear seating disks or washers 21 and 22 which are slidably mounted on the drawbar, the forward movement of the front washer 21 on the drawbar being limited by the shoulder on the drawbar at the forward end of the reduced portion 17a. At its rear end the drawbar has a threaded portion 23 and a tip 24 of reduced diameter. An internally threaded cap 25 is screwed on the threaded portion 22 and shims 26 may be positioned between the bottom of the cap 25 and the end of the drawbar tip 24.

Also washers 27 may be positioned between the forward edge of the cap 25 and the seating disk 22. The cap 25 limits the rearward movement of the disk 22 on the drawbar and also serves to prestress the spring 20 and maintain the spring under an initial pressure. By varying the number of shims 26 and the number of washers 27, the position of the rear seating disk 22 may be adjusted axially of the drawbar to apply a predetermined amount of initial pressure to the spring 20. The disks 21 and 22 provide adjustable spring seats on the drawbar which project beyond the periphery of the drawbar and of the cap 25. The spring seating disks 21 and 22 have a sliding fit in the slot 19 which is slightly wider than the bore which receives the portion 17 of the drawbar and the cap 25. The ends of the slot 19 at opposite sides of the drawbar receiving bore provide ledges or abutments which engage with the spring seating disks 21 and 22.

When pull is exerted on the drawbar 6 a forward thrust is exerted on the spring 20 through the rear seating disk 22, and if this thrust is sufficient to compress the spring 20, the drawbar slides forwardly through the seating disk 21 which is held against movement with the drawbar by the shoulders of the member 18. When the trailer pushes forwardly a forward thrust is exerted upon the seating disk 22, and when the thrust is sufficient to compress the spring 20, the disk 22 slides forwardly on the drawbar.

In assembling the drawbar 6 with the member 18, the spring 20 and disks 21 and 22 may be positioned in the slot 19, the drawbar may then be inserted endwise through the spring and disks, after which the cap 25 may be screwed on to the inner end of the drawbar to prestress the spring 20.

The spring 20 provides a buffer for cushioning forward jerks by the towing vehicle for cushioning rearward bumps exerted by the towing vehicle in backing up and for cushioning forward thrusts exerted by the trailer in traveling downhill or when the velocity of the towing vehicle is sharply curbed.

The prestressing of the spring 20 by means of the adjustable cap 25 prevents compression of the spring and relative movement of the drawbar with respect to the trailer chassis until the pressure exerted forwardly or rearwardly exceeds the amount determined by the initial stress applied to the spring 20. The spring is under an initial stress such that it yields only under substantial thrusts such as are produced when the brakes of the towing vehicle are applied, when the towing vehicle is started suddenly forward or back or in traveling up or down steep grades.

The bearing member 18 is slotted at its rear end to provide a pair of laterally spaced parallel arms 28 which provide a support for an actuating lever 29 mounted between the arms 28 on a horizontal pivot 30. The lever 29 has a forwardly projecting arm 31 which is normally positioned in the path of the rear end of the drawbar 6 so that the lever 29 is moved about its pivot upon rearward movement of the drawbar with respect to the trailer chassis. The lever 29 has a hook 32 at its lower end which engages in an eye 33 formed in an equalizer bar 34 midway between the ends thereof. Cables 35 are attached to opposite ends of the equalizer bar 34 and extend over guide rollers 36 carried by the side frame members 3 and the converging end portions 4 of the frame members. The cables 35 are attached at their rear ends to brake actuating levers 37, each of which operates a trailer brake. When a definite predetermined forward pressure is exerted by the trailer against the towing vehicle, the spring 20 is compressed and the forward end portion of the chassis frame slides forward on the drawbar 6 until the cap 25 on the rear end of the drawbar strikes the projection 31 of the lever 29 and swings the hook 32 forwardly to set the trailer brakes. Each cable 35 preferably has yielding connection to the equalizer bar 34 through a spring 35a to normally maintain a slight tension on the cables so as to insure immediate application of the trailer brakes when the spring 20 is compressed by the forward thrust of the trailer. Individual adjustment of the tension of the springs 35a is obtained by adjusting nuts 35b against which the springs abut.

The lever 29 has a rearward extension 38 above the pivot 30 with which a cam 39 attached to a cross shaft 40 journaled in the arms 28 is adapted to engage. A lever arm 41 is attached to the shaft 40 and by means of the lever arm 41, the shaft 40 and the cam 39 may be turned manually in a clockwise direction, to the position shown in Fig. 8, to depress the extension 38 of the lever 29 and swing the hook 32 forwardly to set the trailer brakes. When the lever 41 is in vertical position, as shown in Fig. 7, the projection 38 is permitted to occupy its forward position and the lever 29 is held in brake releasing position by the cables 35 which are normally under the tension of the springs or other devices which normally hold the brake shoes out of contact with the brake drums. By means of the lever arm 41, the trailer brakes may be set manually for parking or when the trailer is disconnected from the towing vehicle. A crank arm 42 is attached to one end of the shaft 40 and this crank arm is connected to a rod 43 which is mounted to slide longitudinally in a guide member 44 fixed to one side face of the bearing member 18. The forward end of the rod 43 is connected to the towing vehicle by means of a suitable cable such as a chain 45 which is normally slack, but which is tautened upon an abnormally separating movement of the trailer with respect to the towing vehicle; thus if the coupling members should break apart, a strong forward pull would be exerted on the rod 43 through the chain 45 which would tightly set the trailer brakes before the chain 45 is ruptured.

The lever 41 has a forward projection 47 adjacent its lower end which is provided with a notch 48 to receive the rear end of the cap 25 of the drawbar and to provide a stop for the drawbar which will prevent rearward movement of the drawbar in the member 18 sufficient to actuate the brakes through the lever 29. It will be seen that the drawbar locking portion of the lever 41 provides a means for locking out the pressure controlled brake actuating device so that the towing vehicle may be backed up and impart rearward movement to the trailer without causing operation of the trailer brakes.

It is desirable to prevent accidental displacement of the lever 41 from its brake setting and drawbar locking positions and this may be accomplished by providing the cam 39 with two recesses 39a and 39b which are adapted to be engaged alternately by a ball detent 39c which is positioned directly above the shaft 40, the engagement of the ball detent 39c with the recess 39a holding the lever arm 41 in the position shown in Fig. 8 and engagement of the ball detent with the recess 39b serving to releasably hold the lever arm 41 in the position shown in dotted lines in Fig. 7.

When the trailer is a two wheel trailer, it is desirable to provide means for supporting the forward end of the trailer frame when the trailer is disconnected from the towing vehicle. As herein shown, a supporting jack is provided which comprises a standard in the form of an upright rack bar 49 which is slidably mounted in the bearing member 18 and which is operated by means of a pinion 50 on a shaft 51 journalled in the bearing member 18. The shaft 51 may be provided with a crank arm 52 by means of which the pinion may be turned to raise or lower the standard 49. The lower end of the standard 49 has a laterally projecting foot piece 53 which receives the pintle 54 of a fork 55 in which is journalled a caster wheel 56. The face of the standard 49 opposite that carrying the rack teeth is provided with spaced stop teeth 57 which slide in one direction past a yielding detent or latch 58 which is of cylindrical form and rotatably and slidably mounted in the forward portion of the member 18. The latch member 58 has a bevelled rear end face 59 and is pressed toward the standard 49 by means of a coil spring 60. The latch 58 has a thumb piece 61 at its forward end by means of which it may be turned to reverse the position of the bevelled end 59. When the bevelled end 59 is in the position shown in Fig. 6, the standard 49 is free to move downwardly, but is prevented from moving upwardly by the latch 58. When the latch 58 is turned through 180° to reverse the position of the bevelled end face 59 as indicated in dotted lines in Fig. 6, the standard 49 can be moved upwardly by means of the pinion 50 but is locked against downward movement. With the latch 58 in the position shown in full lines in Fig. 6, the rack bar may be lowered to engage the wheel 56 with the ground and the weight of the forward end of the trailer frame is imposed upon the standard 49 through the latch 58. To retract the standard 49 the position of the latch 58 is reversed so that the standard may be lifted freely and retained in elevated position by the latch.

In lowering the caster wheel 56 to supporting position, the standard 49 may be quickly adjusted by positioning the latch 58 to allow downward movement and stepping on the foot piece 53 and exerting a downward thrust thereon to rapidly move the rack bar and wheel downwardly until the wheel engages the ground. When the trailer is again coupled to the towing vehicle, the position of the latch 58 is reversed and the standard 49 is raised by means of the hand crank 52.

Figure 11:
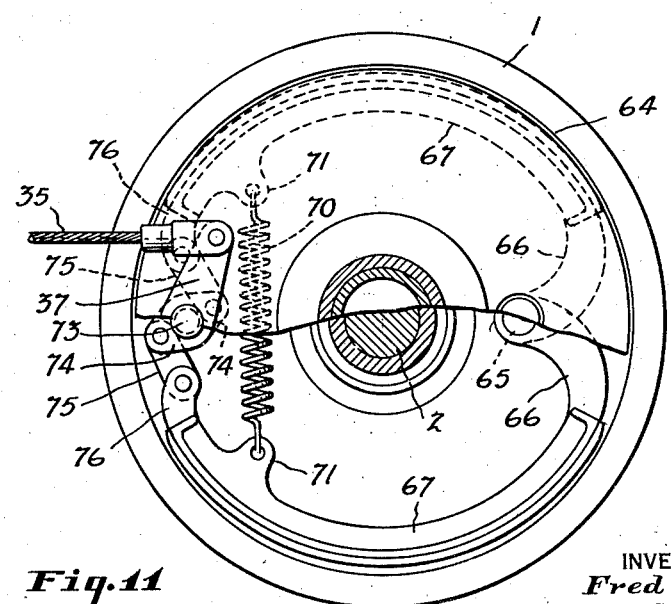
Fig. 11 is a section taken on the line indicated at 11—11 in Fig. 10.

As best shown in Figs. 2 and 10, the trailer axle 2 is provided with flanges 62 adjacent the ends thereof to each of which is rigidly attached a disk 63 which is positioned within a brake drum 64 mounted on a trailer wheel 1. The brakes of the two wheels are identical and each disk 63 has rigidly attached thereto a pin 65 which is positioned rearwardly of the axle 2 and upon which inwardly curved rear ends 66 of a pair of internal brake shoes 67 are pivoted, the rear ends 66 of the brake shoes being retained on the pivot pin 65 by means of a washer 68 held in place by means of an axially disposed screw 69. The forward end portions of the brake shoes 67 are connected forwardly of the axle 2 by a vertically disposed coil spring 70 which has its ends attached to inwardly projecting lugs 71 on the shoes 67. Between the forward ends of the brake shoes 67, the disk 63 is provided with a bearing portion 72 in which is journalled a shaft 73 which has oppositely projecting arms 74 connected by short links 75 to inturned forward ends 76 of the brake shoes 67. Turning of the shaft 73 in a counterclockwise direction, as viewed in Fig. 11, causes the toggle links 74 and 75 to force the ends of the shoes 67 apart and move the shoes 67 into engagement with the interior of the drum 64.

The actuating arm 37 is attached to the inner end of the shaft 73 so that a forward pull on the cable 35 moves the brake shoes into drum engaging position. The springs 70 connecting the brake shoes, serve to keep the cables taut so as to normally hold the lever 29 with its projection 38 pressing forwardly against the cam 39, as shown in Fig. 7. The movement which can be imparted to the lever 29 either by the pressure of the draw bar on the projection 31, or by the pressure of the cam 39 on the projection 38, is sufficient to move the shoes 67 to drum engaging position, and to apply effective pressure to the shoes of the lever 29 having sufficient movement in excess of that initially required to set the brakes to compensate for wear on the brake shoes 67. Since the actuating arms 37 are attached to fixed operating shafts, the springs 70 of the brakes will maintain a substantially equal tension on the two cables 35 to hold the lever 29 at the limit of movement shown in Fig. 7 and to insure release of both brakes upon release of the lever 29.

In Figs. 12 to 15 of the drawings, a modified form of draw bar coupling is shown. In this modification, a draw bar 80 is provided with a slotted end yoke 81 which has an integral front end bearing member 82 engageable with the forward side of a ball pivot 83. Within the slotted yoke, rearwardly of the bearing portion 82, a releasable bearing member 84 is provided which is mounted on a horizontal pivot 85 to swing toward or away from the rear side of the ball pivot 83 attached to a towing vehicle. An integral arm 86 extends upwardly from the bearing member 84 and this arm has an aperture 87 which is adapted to register with apertures 88 in the yoke 81 and receive a locking pin 89 to hold the bearing member 84 in engagement with the ball pivot 83. A second aperture 90 in the arm 86 is adapted to register with the apertures 88 when the bearing member 84 is swung to releasing position and the bearing member may be locked in a releasing position by the pin 89 passing through the apertures 90 and 88. The arm 86 is angle shaped so that its upper end is disposed in horizontal position when the bearing member 84 is swung to its rearmost position and the arm 86 has an eye 91 at its forward end which is adapted to receive an upwardly facing hook 92 attached to a towing vehicle. A suitable keeper bar 93 being provided to close the hook opening, the bar is held in place by means of retaining pins 94 and 95. The bearing members 83 and 84 may be employed to attach the drawbar to a pivot pin attached to an automobile bumper and the arm 86 and eye 91 may be utilized to attach to a connecting member mounted at a higher elevation on a towing vehicle such as a truck.

The principles of the present invention may be utilized in various ways, numerous modifications and alterations being contemplated, substitution of parts and changes in construction being resorted to as desired, it being understood that the embodiments shown in the drawings and described above are given merely for purposes of explanation and illustration without intending to limit the scope of the claims to the specific details disclosed.

What we claim is:

1. In a towing vehicle trailer combination, a drawbar adapted to be coupled to the towing vehicle, a member telescopically receiving the drawbar and connected to the trailer, said member having front and rear abutments adjacent the surface of the drawbar, a spring on the drawbar interposed between said abutments, a lever pivoted to said member and having a portion in the path of the rear end of said drawbar, a trailer brake, brake applying means operated by said lever, a manually operable lever mounted on said member, means controlled by the manually operated lever upon its movement in one direction from a neutral position for actuating the first mentioned lever to apply the brake, and means controlled by the manually operable lever in the opposite direction from its neutral position for locking said drawbar against rearward movement in said member.

2. In a towing vehicle trailer combination, a drawbar adapted to be coupled to the towing vehicle, a member telescopically receiving the drawbar and connected to the trailer, said member having front and rear abutments adjacent the surface of the drawbar, a spring on the drawbar interposed between said abutments, a lever pivoted to said member and having a portion in the path of the rear end of said drawbar, a trailer brake, brake applying means operated by said lever, a manually operable lever mounted on said member, said lever having a cam portion engageable with the first lever to move the same to brake applying position, and an oppositely disposed latch portion engageable with the rear end of said drawbar to restrain movement thereof toward the brake applying lever.

3. In a towing vehicle trailer combination, a drawbar adapted to be coupled to the towing vehicle, a member telescopically receiving the drawbar and connected to the trailer, said member having front and rear abutments adjacent the surface of the drawbar, a spring on the drawbar interposed between said abutments, a lever pivoted to said member and having a portion in the path of the rear end of said drawbar, a trailer brake, brake applying means operated by said lever, a second lever pivoted to said member, a cam operatively connected to the second lever and engageable with the first to move the same to apply the brake, and a cable connecting the second lever to the towing vehicle to actuate the same to apply the brake upon failure of the drawbar connection to the towing vehicle.

4. In a towing vehicle trailer combination, a drawbar adapted to be coupled to the towing vehicle, a member telescopically receiving the drawbar and connected to the trailer, means for cushioning movements of said member with respect to the drawbar, a trailer brake means actuated by said drawbar upon forward movement of the member on the drawbar to apply said trailer brake, a manually operable lever, means controlled by the manually operable lever upon movement in one direction to set the brake, and means operable upon movement of the manually operable lever in the opposite direction to lock the drawbar against rearward movement in said member.

5. In a towing vehicle trailer combination, a drawbar adapted to be coupled to the towing vehicle, a member telescopically receiving the drawbar and connected to the trailer, means for cushioning movements of said member with respect to the drawbar, a lever pivoted to said member and having a portion disposed in the path of movement of a portion of said drawbar, trailer brake operating means operated by said lever, and a second manually operable lever having a portion engageable with the first mentioned lever upon movement of said second lever in one direction to move the first lever to brake applying position, and a portion which upon movement in the opposite direction blocks the rearward movement of the drawbar.

6. In a towing vehicle trailer combination, a drawbar adapted to be coupled to the towing vehicle, a member telescopically receiving the drawbar and connected to the trailer, means for cushioning movements of said member with respect to the drawbar, a lever pivoted to said member and having a portion disposed in the path of movement of a portion of said drawbar, trailer brake operating means operated by said lever, a manually operable lever having a cam engageable with said brake applying lever and movable to a position in which said brake applying lever is locked in brake applying position by said cam, and a cable connecting said manually operable lever to the towing vehicle to move the same to brake setting position upon failure of the drawbar connection to the towing vehicle.

FRED R. KLAUS.
FRED M. KLAUS.